(12) United States Patent
Moriya et al.

(10) Patent No.: US 12,068,479 B2
(45) Date of Patent: Aug. 20, 2024

(54) WINDING-TYPE NONAQUEOUS ELECTROLYTE SECONDARY BATTERY

(71) Applicant: Panasonic Intellectual Property Management Co., Ltd., Osaka (JP)

(72) Inventors: Shigeki Moriya, Osaka (JP); Nobuhiro Sakitani, Tokushima (JP); Takaharu Morikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 454 days.

(21) Appl. No.: 17/430,878

(22) PCT Filed: Feb. 14, 2020

(86) PCT No.: PCT/JP2020/005707
§ 371 (c)(1),
(2) Date: Aug. 13, 2021

(87) PCT Pub. No.: WO2020/175172
PCT Pub. Date: Sep. 3, 2020

(65) Prior Publication Data
US 2022/0037661 A1 Feb. 3, 2022

(30) Foreign Application Priority Data

Feb. 27, 2019 (JP) .................. 2019-034268

(51) Int. Cl.
*H01M 4/36* (2006.01)
*H01M 4/02* (2006.01)
(Continued)

(52) U.S. Cl.
CPC ........... *H01M 4/525* (2013.01); *H01M 4/366* (2013.01); *H01M 4/625* (2013.01); *H01M 4/662* (2013.01);
(Continued)

(58) Field of Classification Search
CPC ...... H01M 4/364; H01M 4/366; H01M 4/625; H01M 4/765; H01M 2004/021; H01M 2004/027; H01M 2004/028
See application file for complete search history.

(56) References Cited

U.S. PATENT DOCUMENTS

| | | | |
|---|---|---|---|
| 2004/0248010 A1 | 12/2004 | Kato et al. | |
| 2010/0136431 A1* | 6/2010 | Lee | H01M 4/13 977/750 |
| 2012/0028123 A1 | 2/2012 | Asari et al. | |

FOREIGN PATENT DOCUMENTS

| | | |
|---|---|---|
| JP | 4-34855 A | 2/1992 |
| JP | 2004-319186 A | 11/2004 |

(Continued)

OTHER PUBLICATIONS

International Search Report dated May 19, 2020, issued in counterpart International Application No. PCT/JP2020/005707 (2 pages).

*Primary Examiner* — Aiqun Li
(74) *Attorney, Agent, or Firm* — WHDA, LLP (57) ABSTRACT

The purpose of the present invention is to provide a winding-type nonaqueous electrolyte secondary battery which is capable of minimizing degradation of charge-discharge cycle characteristics. The winding-type nonaqueous electrolyte secondary battery according to an embodiment of the present invention is provide with a negative electrode that has a negative electrode current collector, an inner-circumference-side negative electrode mixture layer which is disposed, of the two surfaces of the negative electrode current collector, on the inner-circumference-side surface, and an outer-circumference-side negative electrode mixture layer disposed on the outer-circumference-side surface, wherein the inner-circumference-side negative electrode mixture layer and the outer-circumference-side negative electrode mixture layer each include a negative electrode active mate- (Continued)

rial and carbon nanotubes, and the carbon nanotubes in the outer-circumference-side negative electrode mixture layer have an average fiber length of 5-30 um, which is longer than that of the carbon nanotubes in inner-circumference-side negative electrode mixture layer.

3 Claims, 2 Drawing Sheets

(51) Int. Cl.
  *H01M 4/525* (2010.01)
  *H01M 4/62* (2006.01)
  *H01M 4/66* (2006.01)
(52) U.S. Cl.
  CPC ................ *H01M 2004/021* (2013.01); *H01M 2004/027* (2013.01); *H01M 2004/028* (2013.01); *H01M 4/364* (2013.01)

(56) References Cited

FOREIGN PATENT DOCUMENTS

| | | | |
|---|---|---|---|
| JP | 2005-4974 A | 1/2005 |
| JP | 2009-43514 A | 2/2009 |
| JP | 2012-221672 A | 11/2012 |
| WO | 2011/105021 A1 | 9/2011 |
| WO | 2012/147647 A1 | 11/2012 |

* cited by examiner

WINDING-TYPE NONAQUEOUS ELECTROLYTE SECONDARY BATTERY

TECHNICAL FIELD

The present disclosure relates to a technology for a winding-type non-aqueous electrolyte secondary battery.

BACKGROUND ART

Recently, there have widely been used, as high-power, high energy-density secondary batteries, non-aqueous electrolyte secondary batteries which comprise a positive electrode, a negative electrode and a non-aqueous electrolyte and cause lithium ions and the like to move between the positive electrode and the negative electrode to conduct charge-discharge.

For example, PATENT LITERATURE 1 discloses a winding-type non-aqueous electrolyte secondary battery which comprises an electrode assembly having a positive electrode and a negative electrode wound with separators intervening therebetween and at least one of the positive electrode and the negative electrode is an electrode having mixture layers including an active material and a conductive agent arranged on both surface sides of a current collector. This electrode has a larger content of the conductive agent included in the mixture layer arranged on the outer peripheral surface side of the current collector than the content of the conductive agent included in the mixture layer arranged on the inner peripheral surface side of the current collector.

Moreover, for example, PATENT LITERATURES 2 to 4 disclose using carbon nanotubes as conductive agents included in mixture layers of negative electrodes.

CITATION LIST

Patent Literature

PATENT LITERATURE 1: Japanese Unexamined Patent Application Publication No. Hei 4-34855
PATENT LITERATURE 2: Japanese Unexamined Patent Application Publication No. 2004-319186
PATENT LITERATURE 3: Japanese Unexamined Patent Application Publication No. 2005-4974
PATENT LITERATURE 4: WO2012/147647

SUMMARY

Technical Problem

In the electrode assembly having the positive electrode and the negative electrode wound with the separators intervening therebetween, cracks may in some cases occur in the mixture layer arranged on the outer peripheral surface side of the current collector since tensile stress is exerted on the mixture layer on the outer peripheral surface side. In particular, such cracks tend to occur when the thickness of the mixture layer is made larger in order to achieve a higher capacity. Further, when the aforementioned cracks occur, there is a case where the places of the cracks result in their isolation to progress on the active material, which causes degradation of charge-discharge cycle characteristics of the battery.

It is an advantage of the present disclosure to provide a winding-type non-aqueous electrolyte secondary battery capable of restraining the degradation of the charge-discharge cycle characteristics.

Solution to Problem

A winding-type non-aqueous electrolyte secondary battery according to an aspect of the present disclosure comprises: an electrode assembly having a positive electrode and a negative electrode wound with separators intervening therebetween; and a non-aqueous electrolyte, wherein at least any one of the positive electrode and the negative electrode comprises: a current collector; a mixture layer on an inner periphery side that is arranged on a surface that is on the inner periphery side of the current collector; and a mixture layer on an outer periphery side that is arranged on a surface that is on the outer periphery side of the current collector, the mixture layer on the inner periphery side and the mixture layer on the outer periphery side include active material and carbon nanotubes, and the carbon nanotubes of the mixture layer on the outer periphery side have a larger average fiber length than the carbon nanotubes of the mixture layer on the inner periphery side and have 5 μm to 30 μm of average fiber length.

Advantageous Effects of Invention

According to the winding-type non-aqueous electrolyte secondary battery of the present disclosure, the degradation of the charge-discharge cycle characteristics can be restrained.

DESCRIPTION OF EMBODIMENTS

Hereafter, an example of embodiments in the present disclosure will be described based on the drawings.

Figure 1:
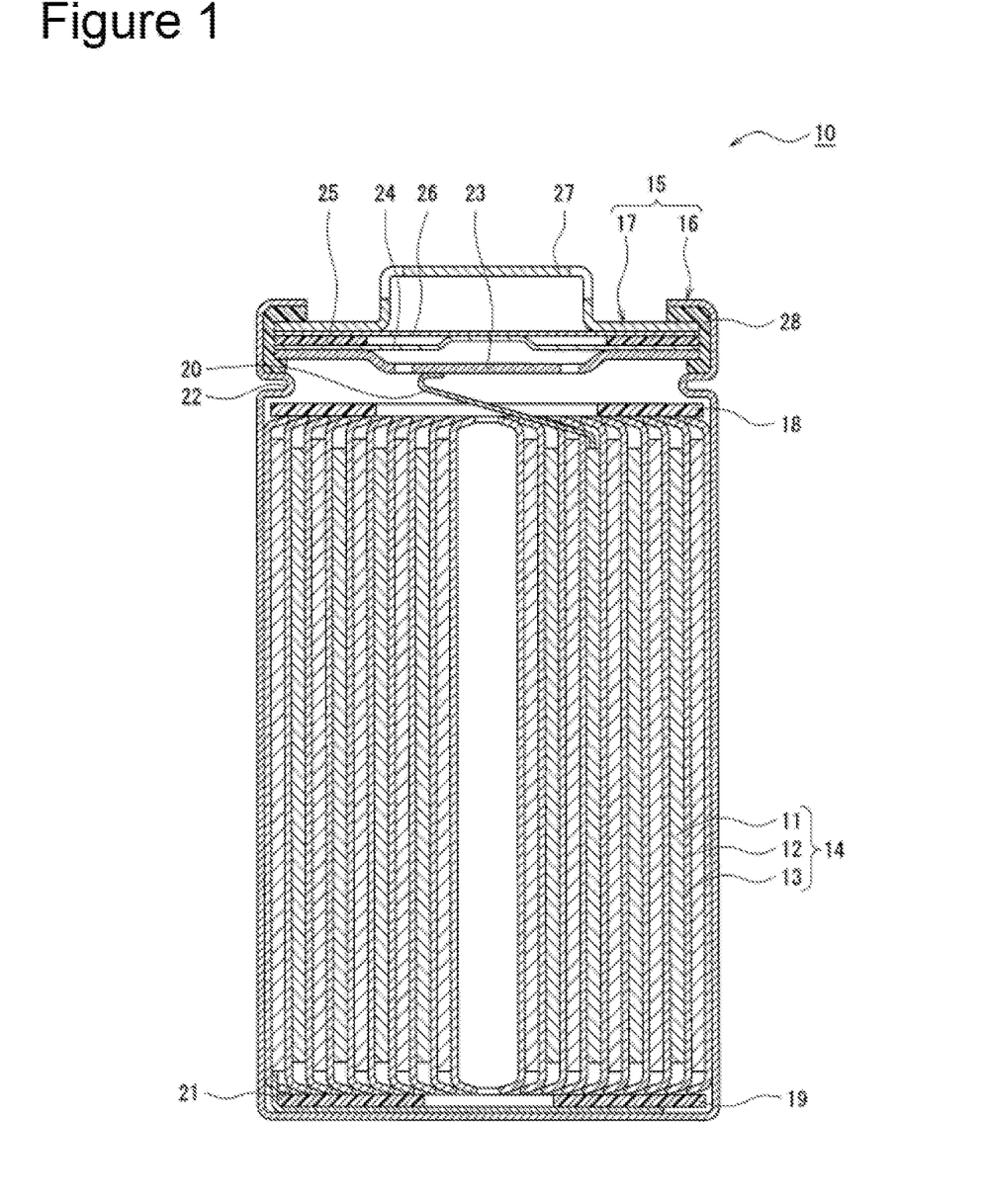
FIG. 1 is a sectional view of a non-aqueous electrolyte secondary battery which is an example of embodiments.

FIG. 1 is a sectional view of a non-aqueous electrolyte secondary battery which is an example of embodiments. As exemplarily shown in FIG. 1, a non-aqueous electrolyte secondary battery 10 comprises an electrode assembly 14, a non-aqueous electrolyte and a battery case 15 housing the electrode assembly 14 and the non-aqueous electrolyte. The electrode assembly 14 comprises a positive electrode 11, a negative electrode 12 and separators 13 interposed between the positive electrode 11 and the negative electrode 12. The electrode assembly 14 has a winding structure in which the positive electrode 11 and the negative electrode 12 are wound with the separators 13 intervening therebetween.

The non-aqueous electrolyte includes a non-aqueous solvent and an electrolyte salt dissolved in the non-aqueous solvent. For the non-aqueous solvent, there may be used, for example, esters, ethers, nitriles, amides, mixed solvents of two kinds or more of these, and the like. The non-aqueous solvent may contain a halogen-substituted substance in which at least some of the hydrogen atoms of the above-described solvents are replaced with halogen atoms such as fluorine. Notably, the non-aqueous electrolyte is not limited to a liquid electrolyte but may be a solid electrolyte. For the electrolyte salt, a lithium salt such as $LiPF_6$ is used, for example.

The battery case 15 is constituted of a bottomed cylindrical exterior can 16 and a sealing assembly 17 closing an opening of the exterior can 16.

The exterior can 16 is a bottomed cylindrical metal-made container, for example. A gasket 28 is provided between the exterior can 16 and the sealing assembly 17 and the sealing property of the interior of the battery is secured. The exterior can 16 has a grooved part 22 which has a part of its lateral surface part, for example, made to project to the inside and supports the sealing assembly 17. The grooved part 22 is preferably formed into an annular shape along the circumferential direction of the exterior can 16 and supports the sealing assembly 17 on its upper surface.

The sealing assembly 17 has a structure in which a filter 23, a lower vent member 24, an insulating member 25, an upper vent member 26 and a cap 27 are laminated sequentially from the electrode assembly 14 side. The members constituting the sealing assembly 17 have disc shapes or ring shapes, for example, and the members except the insulating member 25 are electrically connected to one another. The lower vent member 24 and the upper vent member 26 are connected to each other at their center parts, and the insulating member 25 interposes between their peripheral edges. When the internal pressure of the battery rises due to abnormal heat generation, the lower vent member 24 deforms so as to push the upper vent member 26 upward to the cap 27 side to fracture, which disconnects the current path between the lower vent member 24 and the upper vent member 26. When the internal pressure further rises, the upper vent member 26 fractures, and gas is discharged from an opening of the cap 27.

The non-aqueous electrolyte secondary battery 10 comprises insulating plates 18 and 19 arranged on and below on the electrode assembly 14, respectively. In the example shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom part side of the exterior can 16 through the outside of the insulating plate 19. The positive electrode lead 20 is connected to a lower surface of the filter 23 of the sealing assembly 17 by welding or the like, and the cap 27 of the sealing assembly 17 electrically connected to the filter 23 is a positive electrode terminal. The negative electrode lead 21 is connected to an inner surface of the bottom part of the exterior can 16 by welding or the like, and the exterior can 16 is a negative electrode terminal.

Hereafter, the positive electrode 11, the negative electrode 12 and the separators 13 constituting the electrode assembly 14 will be described.

Negative Electrode 12

Figure 2:
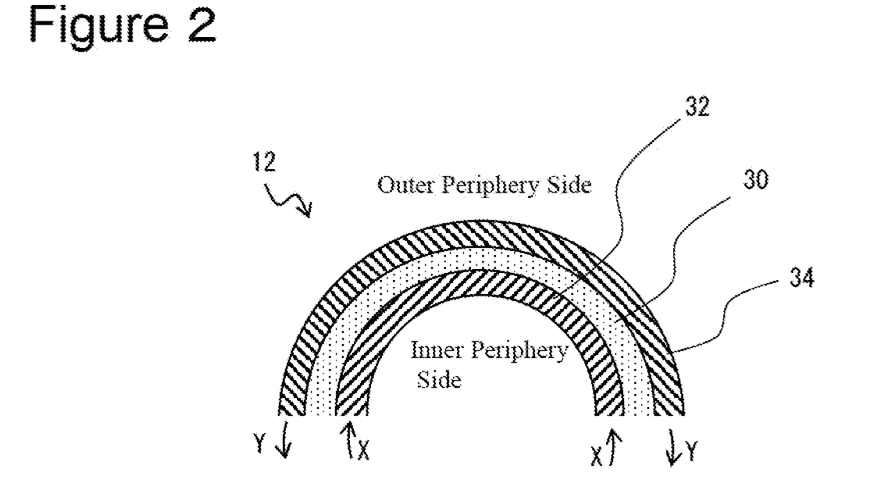
FIG. 2 is a partial sectional view of a negative electrode as viewed from the winding axis direction of an electrode assembly having a winding structure.

FIG. 2 is a partial sectional view of a negative electrode as viewed from the winding axis direction of an electrode assembly having the winding structure. As shown in FIG. 2, the negative electrode 12 has a negative electrode current collector 30, a negative electrode mixture layer 32 on an inner periphery side that is arranged on a surface, of both surfaces of the negative electrode current collector 30, that is on the inner periphery side, and a negative electrode mixture layer 34 on an outer periphery side that is arranged on a surface that is on the outer periphery side. Notably, the inner periphery side of the negative electrode current collector 30 is a surface, of the negative electrode current collector 30, that is positioned on the inner side of the wound negative electrode 12 in the radial direction, and the outer periphery side of the negative electrode current collector 30 is a surface, of the negative electrode current collector 30, that is positioned on the outer side of the wound negative electrode 12 in the radial direction.

For the negative electrode current collector 30, there can be used, for example, foil of a metal such as copper, stable in the potential range of the negative electrode, a film having the metal disposed on its surface layer, and the like.

The negative electrode mixture layer 32 on the inner periphery side and the negative electrode mixture layer 34 on the outer periphery side include negative electrode active material and carbon nanotubes, and include arbitrary binder and the like.

The negative electrode 12 is obtained, for example, by applying and drying negative electrode mixture shiny for the inner periphery side including the negative electrode active material, the carbon nanotubes, the arbitrary binder and the like onto one of the surfaces of the negative electrode current collector 30 to form the negative electrode mixture layer 32 on the inner periphery side, moreover applying and drying negative electrode mixture slurry for the outer periphery side including the negative electrode active material, the carbon nanotubes, and the binder and the like as arbitrary component(s) onto the other of the surfaces of the negative electrode current collector 30 to form the negative electrode mixture layer 34 on the outer periphery side, and rolling these negative electrode mixture layers.

The negative electrode active material included in the negative electrode mixture layer 32 on the inner periphery side and the negative electrode mixture layer 34 on the outer periphery side is not specially limited as long as it is a material which can store and release lithium ions, and examples thereof include metal lithium, lithium alloys such as lithium-aluminum alloy, lithium-lead alloy, lithium-silicon alloy, and lithium-tin alloy, carbon materials such as graphite, coke, and organic fired substance, metal oxides such as $SnO_2$, SnO, and $TiO_2$, and the like. These may be used singly or in combinations of two or more thereof.

The content of the negative electrode active material in the negative electrode mixture layer 32 on the inner periphery side is preferably, for example, in a range of 90 mass % to 99 mass % relative to the mass of the negative electrode mixture layer 32 on the inner periphery side, still preferably in a range of 95 mass % to 98 mass %. The same holds true for the negative electrode active material in the negative electrode mixture layer 34 on the outer periphery side.

For the carbon nanotubes included in the negative electrode mixture layer 32 on the inner periphery side and the negative electrode mixture layer 34 on the outer periphery side, there can be used, for example, carbon nanotubes in a tubular structure in which graphene sheets composed of carbon six-membered rings are wound to be parallel to the fiber axis, carbon nanotubes in a platelet structure in which graphene sheets composed of carbon six-membered rings are arranged to be perpendicular to the fiber axis, carbon nanotubes in a herringbone structure in which graphene sheets composed of carbon six-membered rings are wound at an oblique angle to the fiber axis, and the like.

The carbon nanotubes included in the negative electrode mixture layer 34 on the outer periphery side have a larger average fiber length (that is, average fiber length) than the carbon nanotubes included in the negative electrode mixture layer 32 on the inner periphery side, and have 5 µm to 30 µm of average fiber length, preferably having 10 µm to 25 µm of average fiber length. The carbon nanotubes included in the negative electrode mixture layer 32 on the inner periphery side have a smaller average fiber length than the carbon nanotubes included in the negative electrode mixture layer 34 on the outer periphery side, and preferably have 25 μm or less of average fiber length, still preferably having less than 5 μm of average fiber length. The lower limit is not specially limited but desirably 1 μm or more in view of easiness in production of carbon nanotubes. The average fiber length of the carbon nanotubes can be measured using a scanning electron microscope (SEM). Specifically, fiber lengths are measured for ten carbon nanotubes in the field of view of the scanning electron microscope to set an average value of those to the average fiber length.

Here, in production of the electrode assembly 14, when the negative electrode 12 is wound, a difference in curvature is to cause compressive stress as shown by arrows X in FIG. 2 to be exerted on the negative electrode mixture layer 32 on the inner periphery side arranged on the inner periphery side of the negative electrode current collector 30, and tensile stress as shown by arrows Y in FIG. 2 to be exerted on the negative electrode mixture layer 34 on the outer periphery side arranged on the outer periphery side of the negative electrode current collector 30. Further, there can be a case where cracks occur in the negative electrode mixture layer 34 on the outer periphery side due to the tensile stress and the places of the cracks result in their isolation to progress on the negative electrode active material, which causes the degradation of the charge-discharge cycle characteristics. However, by allowing the negative electrode mixture layer 34 on the outer periphery side to include carbon nanotubes which have a larger average fiber length than carbon nanotubes included in the negative electrode mixture layer 32 on the inner periphery side and have 5 μm to 30 μm of average fiber length as in the non-aqueous electrolyte secondary battery 10 of the present embodiment, it can be considered that, for example, a high anchor effect is achieved, adhesive bonding strength between negative electrode active material particles is improved, and cracks in the negative electrode mixture layer 34 on the outer periphery side can be restrained. As a result, the degradation of the charge-discharge cycle characteristics can be restrained.

The content of the carbon nanotubes included in the negative electrode mixture layer 34 on the outer periphery side is preferably, for example, 0.1 mass % or more relative to the mass of the negative electrode active material included in the negative electrode mixture layer 34 on the outer periphery side, still preferably 1 mass % or more, in view of the charge-discharge cycle characteristics. Notably, the upper limit is also not specially limited but preferably, for example, 5 mass % or less since too much content of the carbon nanotubes results in a decrease in amount of the negative electrode active material, which can lead to a decrease in capacity of the secondary battery. The content of the carbon nanotubes included in the negative electrode mixture layer 32 on the inner periphery side is preferably, for example, 0.1 mass % or more and 5 mass % or less similarly to the case of the negative electrode mixture layer 34 on the outer periphery side.

An average diameter (that is, average fiber diameter) of the carbon nanotubes included in the negative electrode mixture layer 32 on the inner periphery side and the negative electrode mixture layer 34 on the outer periphery side is preferably, for example, in a range of about 4 to 200 nm, still preferably about 4 to 150 nm. The average diameter of the carbon nanotubes can be measured by a scanning electron microscope (SEM). Specifically, diameters are measured for ten carbon nanotubes in the field of view of the scanning electron microscope to set an average value of those to the average diameter.

For the binder included in the negative electrode mixture layer 32 on the inner periphery side and the negative electrode mixture layer 34 on the outer periphery side, there can be used, for example, fluorine-based resins such as polyvinylidene fluoride (PVdF), PAN, polyimide-based resins, acrylic resins, polyolefin-based resins, styrene-butadiene rubber (SBR), carboxymethylcellulose (CMC) or its salt, polyacrylic acid (PAA) or its salt, polyvinyl alcohol (PVA), and the like.

Each of thicknesses of the negative electrode mixture layer 32 on the inner periphery side and the negative electrode mixture layer 34 on the outer periphery side is preferably, for example, in a range of 10 μm to 100 μm. Although in general, making negative electrode mixture layers thicker results in more tendency to occurrence of cracks in the negative electrode mixture layers (in particular, cracks in the negative electrode mixture layer 34 on the outer periphery side), in the present embodiment, cracks in negative electrode mixture layers are restrained from occurring due to the negative electrode mixture layers made thick.

Positive Electrode 11

Figure 3:
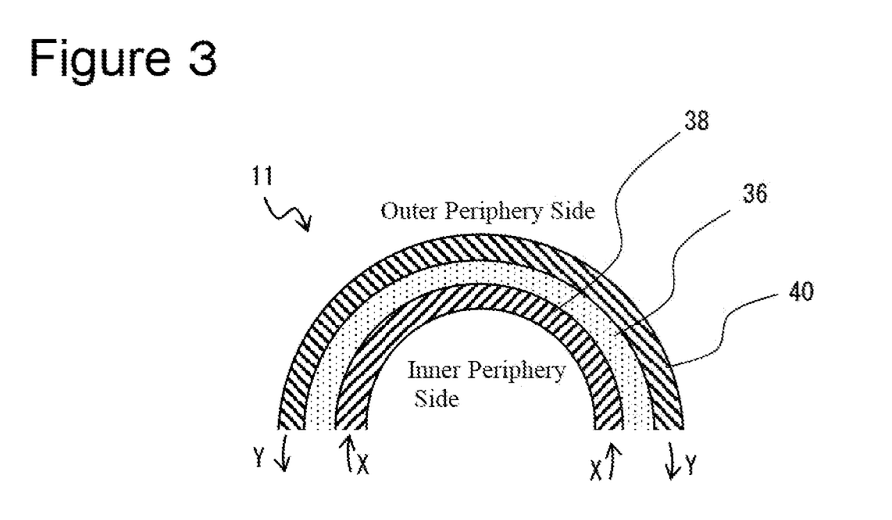
FIG. 3 is a partial sectional view of a positive electrode as viewed from the winding axis direction of the electrode assembly having the winding structure.

FIG. 3 is a partial sectional view of a positive electrode as viewed from the winding axis direction of the electrode assembly having the winding structure. As shown in FIG. 3, the positive electrode 11 has a positive electrode current collector 36, a positive electrode mixture layer 38 on an inner periphery side that is arranged on a surface, of both surfaces of the positive electrode current collector 36, that is on the inner periphery side, and a positive electrode mixture layer 40 on an outer periphery side that is arranged on a surface that is on the outer periphery side. Notably, the inner periphery side of the positive electrode current collector 36 is a surface, of the positive electrode current collector 36, that is positioned on the inner side of the wound positive electrode 11 in the radial direction, and the outer periphery side of the positive electrode current collector 36 is a surface, of the positive electrode current collector 36, that is positioned on the outer side of the wound positive electrode 11 in the radial direction.

For the positive electrode current collector 36, there can be used, for example, foil of a metal, such as aluminum and aluminum alloy, stable in the potential range of the positive electrode 11, a film having the metal disposed on its surface layer, and the like.

The positive electrode mixture layer 38 on the inner periphery side and the positive electrode mixture layer 40 on the outer periphery side include positive electrode active material, carbon nanotubes, arbitrary binder, and the like.

The positive electrode 11 is obtained, for example, by applying and drying positive electrode mixture slurry for the inner periphery side including the positive electrode active material, the carbon nanotubes, the binder and the like as arbitrary component(s) onto one of the surfaces of the positive electrode current collector 36 to form the positive electrode mixture layer 38 on the inner periphery side, moreover applying and drying positive electrode mixture slimy for the outer periphery side including the positive electrode active material, the carbon nanotubes, and the binder and the like as arbitrary component(s) onto the other of the surfaces of the positive electrode current collector 36 to form the positive electrode mixture layer 40 on the outer periphery side, and rolling these negative electrode mixture layers.

The positive electrode active material includes a lithium-containing transition metal oxide, for example. Metal element(s) constituting the lithium-containing transition metal oxide include at least one selected from the group consisting of magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi), for example. Among these, it (they) preferably includes at least one selected from the group consisting of Co, Ni, Mn, and Al.

The content of the positive electrode active material in the positive electrode mixture layer 38 on the inner periphery side is preferably, for example, in a range of 90 mass % to 99 mass % relative to the mass of the positive electrode mixture layer 38 on the inner periphery side, still preferably in a range of 95 mass % to 98 mass %. The same holds true for the positive electrode active material in the positive electrode mixture layer 40 on the outer periphery side.

For the carbon nanotubes included in the positive electrode mixture layer 38 on the inner periphery side and the positive electrode mixture layer 40 on the outer periphery side, there can be used, for example, carbon nanotubes in the tubular structure, carbon nanotubes in the platelet structure, carbon nanotubes in the herringbone structure, and the like similarly to the negative electrode side.

The carbon nanotubes included in the positive electrode mixture layer 40 on the outer per side have a larger average fiber length (that is, average fiber length) than the carbon nanotubes included in the positive electrode mixture layer 38 on the inner periphery side, and have 5 μm to 30 μm of average fiber length, preferably having 10 μm to 25 μm of average fiber length. The carbon nanotubes included in the positive electrode mixture layer 38 on the inner periphery side have a smaller average fiber length than the carbon nanotubes included in the positive electrode mixture layer 40 on the outer periphery side, and preferably have 25 μm or less of average fiber length, still preferably having less than 5 μm of average fiber length. The lower limit is not specially limited but desirably 1 μm or more in view of easiness in production of carbon nanotubes.

By allowing the positive electrode mixture layer 40 on the outer periphery side to include carbon nanotubes which have a larger average fiber length than carbon nanotubes included in the positive electrode mixture layer 38 on the inner periphery side and have 5 μm to 30 μm of average fiber length as above, it can be considered that, for example, a high anchor effect is achieved, adhesive bonding strength between positive electrode active material particles is improved, and cracks in the positive electrode mixture layer 40 on the outer periphery side can be restrained. As a result, the degradation of the charge-discharge cycle characteristics can be restrained.

The content of the carbon nanotubes included in the positive electrode mixture layer 40 on the outer periphery side is preferably, for example, 0.1 mass % or more relative to the mass of the positive electrode active material included in the positive electrode mixture layer 40 on the outer periphery side, still preferably 1 mass % or more, in view of the charge-discharge cycle characteristics. Notably, the upper limit is also not specially limited but preferably, for example, 5 mass % or less since too much content of the carbon nanotubes results in a decrease in amount of the positive electrode active material, which can lead to a decrease in capacity of the secondary battery. The content of the carbon nanotubes included in the positive electrode mixture layer 38 on the inner periphery side is preferably 0.1 mass % or more and 5 mass % or less similarly to the case of the positive electrode mixture layer 40 on the outer periphery side.

An average diameter of the carbon nanotubes included in the positive electrode mixture layer 38 on the inner periphery side and the positive electrode mixture layer 40 on the outer periphery side is preferably, for example, in a range of about 4 to 200 nm, still preferably about 4 to 150 nm.

For the binder included in the positive electrode mixture layer 38 on the inner periphery side and the positive electrode mixture layer 40 on the outer periphery side, one similar to that on the negative electrode side can be used.

Each of thicknesses of the positive electrode mixture layer 38 on the inner periphery side and the positive electrode mixture layer 40 on the outer periphery side is preferably, for example, in a range of 10 μm to 100 μm. Although in general, making positive electrode mixture layers thicker results in more tendency to occurrence of cracks in the positive electrode mixture layers (in particular, cracks in the positive electrode mixture layer 40 on the outer periphery side), in the present embodiment, cracks in positive electrode mixture layers are restrained from occurring due to the positive electrode mixture layers made thick.

In the non-aqueous electrolyte secondary battery 10 of the present embodiment, as to each of the positive electrode 11 and the negative electrode 12, the carbon nanotubes therein is set such that the carbon nanotubes included in the mixture layer on the outer periphery side have a larger average fiber length than the carbon nanotubes included in the mixture layer on the inner periphery side and have 5 μm to 30 μm of average fiber length, but not limited to these. Since when there can be restrained cracks in the mixture layer on the outer periphery side due to the tensile stress on any one of the positive electrode 11 and the negative electrode 12, this leads to restraint of the degradation of the charge-discharge cycle characteristics, any one of the positive electrode 11 and the negative electrode 12 is sufficient. Note that application at least to the negative electrode 12 is preferable since occurrence of cracks in the mixture layer on the outer periphery side due to the tensile stress more tends to occur on the negative electrode mixture layer 34 on the outer periphery side than on the positive electrode mixture layer 40 on the outer periphery side.

Separators 13

For the separators 13, there are used, for example, porous sheets having ion permeability and insulation properties, and the like, Specific examples of the porous sheets include microporous thin films, woven fabric, nonwoven fabric, and the like. For the materials of the separators, there are preferably olefin-based resins such as polyethylene and polypropylene, cellulose, and the like. The separators 13 may be stacked bodies having cellulose fiber layers and thermoplastic resin fiber layers such as olefin-based resins. Moreover, they may be multilayer separators including polyethylene layers and polypropylene layers and there may be used ones having materials such as aramid-based resins and ceramics applied onto the surfaces of the separators.

EXAMPLES

While the present disclosure will be hereinafter further described with examples, the present disclosure is not limited to the following examples.

Example 1

Negative Electrode 95 parts by mass of graphite powder as the negative electrode active material, 5 parts by mass of Si oxide as the negative electrode active material, 0.8 parts by mass of carboxymethylcellulose (CMC), 1 part by mass of carbon nanotubes (CNTs) with 30 μm of average fiber length, and water were mixed. To this mixture, 1.2 parts by mass of styrene-butadiene rubber (SBR), and water were mixed to prepare the negative electrode mixture slurry for the outer periphery side. Moreover, 95 parts by mass of graphite powder, 5 parts by mass of Si oxide, 1.2 parts by mass of carboxymethylcellulose (CMC), and water were mixed. To this mixture, 0.8 parts by mass of styrene-butadiene rubber (SBR), 1 part by mass of carbon nanotubes (CNTs) with 4 μm of average fiber length, and water were mixed to prepare the negative electrode mixture slurry for the inner periphery side.

Next, the negative electrode mixture slurry for the inner periphery side was applied and dried onto a surface, of both surfaces of the negative electrode current collector composed of copper foil, that was on the inner periphery side after winding to form the negative electrode mixture layer for the inner periphery side. Moreover, the negative electrode mixture slurry for the outer periphery side was applied and dried onto a surface, of both surfaces of the negative electrode current collector, that was on the outer periphery side after winding, to form the negative electrode mixture layer for the outer periphery side. Then the negative electrode mixture layers were rolled by rolling rollers. This was set as the negative electrode.

Production of Positive Electrode $LiNi_{0.8}Co_{0.15}Al_{0.05}O_2$ as the positive electrode active material, acetylene black (AB), and polyvinylidene fluoride (PVDF) were mixed in the mass ratios of 94:5:1, and furthermore, an appropriate amount of N-methyl-2-pyrrolidone (NMP) was added to those to prepare the positive electrode mixture slurry. Next, this positive electrode mixture slurry was applied and dried onto both surfaces of the positive electrode current collector composed of aluminum foil to form the positive electrode mixture layers. Then, the positive electrode mixture layers were rolled by rolling rollers. This was set as the positive electrode.

Preparation of Non-Aqueous Electrolyte

Ethylene carbonate (EC), ethyl methyl carbonate (EMC), and dimethyl carbonate (DMC) were mixed in the volume ratios of 3:3:4. $LiPF_6$ was dissolved in the mixed solvent so as to be in 1.2 mol/L of concentration to prepare the non-aqueous electrolyte.

Production of Non-Aqueous Electrolyte Secondary Battery

The aforementioned positive electrode and negative electrode were wound on a winding core with 1.5 mm of radius of curvature with intervening therebetween the separators each having 20 μm of thickness and composed of a microporous film made of polyethylene, and a tape was pasted on the outermost circumferential surface to produce a cylindrical electrode assembly. When being wound, they were arranged such that the negative electrode mixture layer obtained by application of the negative electrode mixture slurry for the outer periphery side was on the outer periphery side and the negative electrode mixture layer obtained by application of the negative electrode mixture slurry on the inner periphery side was on the inner periphery side. Notably, a positive electrode lead made of aluminum and a negative electrode lead made of nickel were welded to the positive electrode and the negative electrode, respectively.

The aforementioned electrode assembly was housed in a bottomed cylindrical exterior can, and the positive electrode lead and the negative electrode lead were welded to the sealing assembly and the inner bottom surface of the exterior can, respectively. After the aforementioned non-aqueous electrolyte was injected into the exterior can, the opening of the exterior can was sealed with the sealing assembly to produce a non-aqueous electrolyte secondary battery (65 mm of height, 18 mm of diameter, and 3000 mAh of designed capacity).

Example 2

A non-aqueous electrolyte secondary battery was produced similarly to Example 1 except that carbon nanotubes with 5 μm of average fiber length were used in preparation of the negative electrode mixture shiny for the outer periphery side.

Example 3

A non-aqueous electrolyte secondary battery was produced similarly to Example 1 except that carbon nanotubes with 25 μm of average fiber length were used in preparation of the negative electrode mixture slurry for the inner periphery side.

Comparative Example 1

A non-aqueous electrolyte secondary battery was produced similarly to Example 1 except that carbon nanotubes with 30 μm of average fiber length (the same material as the carbon nanotubes included in the negative electrode mixture slurry for the outer periphery side) were used in preparation of the negative electrode mixture slurry for the inner periphery side.

Comparative Example 2

A non-aqueous electrolyte secondary battery was produced similarly to Example 1 except that carbon nanotubes with 5 μm of average fiber length were used in preparation of the negative electrode mixture slurry for the outer periphery side and that carbon nanotubes with 5 μm of average fiber length were used in preparation of the negative electrode mixture slurry for the inner periphery side.

Comparative Example 3

A non-aqueous electrolyte secondary battery was produced similarly to Example 1 except that carbon nanotubes with 4 μm of average fiber length were used in preparation of the negative electrode mixture slurry for the outer periphery side and that carbon nanotubes with 3 μm of average fiber length were used in preparation of the negative electrode mixture slurry for the inner periphery side.

Comparative Example 4

A non-aqueous electrolyte secondary battery was produced similarly to Example 1 except that carbon nanotubes with 4 μm of average fiber length were used in preparation of the negative electrode mixture slurry for the outer periphery side and that carbon nanotubes with 30 μm of average fiber length were used in preparation of the negative electrode mixture slurry or the inner periphery side.

Comparative Example 5

A non-aqueous electrolyte secondary battery was produced similarly to Example 1 except that carbon nanotubes with 4 μm of average fiber length were used in preparation of the negative electrode mixture slurry for the outer periphery side and that carbon nanotubes with 5 μm of average fiber length were used in preparation of the negative electrode mixture slurry for the inner periphery side.

Evaluation of Capacity Retention in Charge-Discharge Cycles

For the non-aqueous electrolyte secondary batteries of the examples and the comparative examples, charge-discharge cycle tests were conducted under the following conditions. In an environment of 25° C. of temperature, after constant current charging (current: 0.3It=900 mA; cut-off voltage: 4.2 V)-constant voltage charging (voltage: 4.2 V; cut-off current 150 mA), they were discharged down to 2.75 V of cut-off voltage at 900 mA of current value. One thousand cycles of this charge-discharge were performed and capacity retentions in the charge-discharge cycles were calculated based on the following equation. Table 1 presents the results.

Capacity retention=($X2/X1$)×100

X1: Discharge capacity in the first cycle
X2: Discharge capacity in the thousandth cycle

TABLE 1

| | CNT Average Fiber Length (μm) | | Charge-Discharge Cycle Capacity Retention (%) |
|---|---|---|---|
| | Outer Periphery Side | Inner Periphery Side | |
| Example 1 | 30 | 4 | 70 |
| Example 2 | 5 | 4 | 66 |
| Example 3 | 30 | 25 | 68 |
| Comparative Example 1 | 30 | 30 | 57 |
| Comparative Example 2 | 5 | 5 | 56 |
| Comparative Example 3 | 4 | 3 | 57 |
| Comparative Example 4 | 4 | 30 | 49 |
| Comparative Example 5 | 4 | 5 | 55 |

In Examples 1 to 3, the carbon nanotubes of the negative electrode mixture layer on the outer periphery side have a larger average fiber length than the carbon nanotubes of the negative electrode mixture layer on the inner periphery side and have 5 μm to 30 μm of average fiber length. In Comparative Examples 1 to 2, the carbon nanotubes of the negative electrode mixture layer on the outer periphery side and the carbon nanotubes of the negative electrode mixture layer on the inner periphery side have the same average fiber length, in Comparative Example 3, while the carbon nanotubes of the negative electrode mixture layer on the outer periphery side have a larger average fiber length than the carbon nanotubes of the negative electrode mixture layer on the inner periphery side, they have less than 5 μm of average fiber length, in Comparative Examples 4 and 5, the carbon nanotubes of the negative electrode mixture layer on the outer periphery side have a smaller average fiber length than the carbon nanotubes of the negative electrode mixture layer on the inner periphery side. Comparisons of Examples 1 to 3 and Comparative Examples 1 to 5 revealed that all of Examples 1 to 3 exhibited higher values of capacity retentions in the charge-discharge cycles than Comparative Examples 1 to 5. Namely, in Examples 1 to 3, the degradation of the charge-discharge cycle characteristics was restrained.

REFERENCE SIGNS LIST 10 non-aqueous electrolyte secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 grooved part
23 filter
24 lower vent member
25 insulating member
26 upper vent member
27 cap
28 gasket
30 negative electrode current collector
32 negative electrode mixture layer on the inner periphery side
34 negative electrode mixture layer on the outer periphery side
36 positive electrode current collector
38 positive electrode mixture layer on the inner periphery side
40 positive electrode mixture layer on the outer periphery side

The invention claimed is:

1. A winding-type non-aqueous electrolyte secondary battery, comprising:
an electrode assembly having a positive electrode and a negative electrode wound with separators intervening therebetween; and
a non-aqueous electrolyte, wherein
at least one of the positive electrode and the negative electrode comprises:
a current collector; a mixture layer on an inner periphery side that is arranged on a surface of the current collector that is on the inner periphery side; and a mixture layer on an outer periphery side that is arranged on a surface of the current collector that is on the outer periphery side,
the mixture layer on the inner periphery side and the mixture layer on the outer periphery side include active material and carbon nanotubes, and
the carbon nanotubes of the mixture layer on the outer periphery side have a larger average fiber length than the carbon nanotubes of the mixture layer on the inner periphery side and have 5 μm to 30 μm of average fiber length.

2. The winding-type non-aqueous electrolyte secondary battery according to claim 1, wherein the carbon nanotubes of the mixture layer on the inner periphery side have 25 μm or less of average fiber length.

3. The winding-type non-aqueous electrolyte secondary battery according to claim 1, wherein the carbon nanotubes of the mixture layer on the inner periphery side have less than 5 μm of average fiber length.

* * * * *